United States Patent [19]

Foldessy, Jr.

[11] 4,027,411
[45] June 7, 1977

[54] MICROFICHE MARKING SYSTEM

[76] Inventor: Joseph Foldessy, Jr., 18430 NW. 38 Court, Opa Locka, Fla. 33055

[22] Filed: Feb. 19, 1976

[21] Appl. No.: 659,444

[52] U.S. Cl. .............................................. 40/106.1
[51] Int. Cl.² ......................................... G09F 13/10
[58] Field of Search ........... 40/106.1, 158 R, 158 B, 40/63 A, 64 A

[56] References Cited

UNITED STATES PATENTS

| 1,477,131 | 12/1923 | Kulik | 40/158 B |
| 3,075,178 | 1/1963 | James | 340/172.5 |
| 3,332,071 | 7/1967 | Goldman et al. | 340/172.5 |
| 3,343,957 | 9/1967 | Townsley | 40/158 R |
| 3,389,242 | 6/1968 | Cross | 235/61.12 |
| 3,418,119 | 12/1968 | Schwartz et al. | 40/158 R |
| 3,485,094 | 12/1969 | Simpson | 40/106.1 X |
| 3,751,152 | 8/1973 | Rinehart | 353/26 |
| 3,956,054 | 5/1956 | Griswold et al. | 40/106.1 |

Primary Examiner—G. E. McNeill
Assistant Examiner—Wenceslao J. Contreras
Attorney, Agent, or Firm—Marvin Reich

[57] ABSTRACT

A system for alerting users of standard microfiche readers to updating of stored information. Printed "update" sheets permit a user to make full notation of complete information for ready reference by subsequent users. An illuminated viewer allows placement of a coded transparent grid card beneath a fiche on the viewer illuminated panel so that frame numbers are visible through the fiche. By use of permanent or washable translucent ink or opaque ink marker pens, coordinate squares of the fiche are appropriately marked to indicate updated information or deleted information.

4 Claims, 6 Drawing Figures

MICROFICHE MARKING SYSTEM

BACKGROUND OF THE INVENTION

The prior art pertaining to information retrieval and storage systems contains some suggestions and teachings on update information display or recognition means. Examples of the patented prior art are U.S. Pats. Nos. 3,075,178; 3,332,071; 3,389,242; and 3,751,152. As is apparent from a consideration of these patents, the information update means is incorporated within sophisticated and costly electronics equipment or electro-optical equipment, for the most part, making such prior art means unsuitable to satisfy the aims and purposes of the present invention.

The objective of this invention is to provide a simplified basically manual arrangement or system for marking on individual microfiche elements at precise locations thereon stored information update or deletion reader alert markings, such as translucent ink markings or opaque ink markings, respectively. Without costly optical or electronics equipment, the user who is employing a standard reader to view a fiche may enter full notation of update data or data deletion on a provided printed form which may be filed for ready reference by subsequent users or readers. After completing the notation, a simple inexpensive illuminated viewer with right angular guides is employed to position a coded transparent coordinate grid card or element on the viewer illuminated panel, beneath a microfiche which is also engaged with the guides to bring the fiche into exact coordinate registration with the coded grid element. Translucent or opaque ink markers are then used to fill in coordinate squares on the fiche to indicate changed information or deleted information, the coded indicia of the grid element being then readable through the translucent fiche. The resulting ink markings on the fiche will alert subsequent readers or searchers of information updating or complete deletions so that reference to the complete notation on the update sheet may be had. The system is economical, convenient and practical and it satisfies a need which the more sophisticated and costly equipment and systems of the prior art cannot satisfy.

Other features and advantages of the invention will become apparent during the course of the following description.

DETAILED DESCRIPTION

Figure 1:
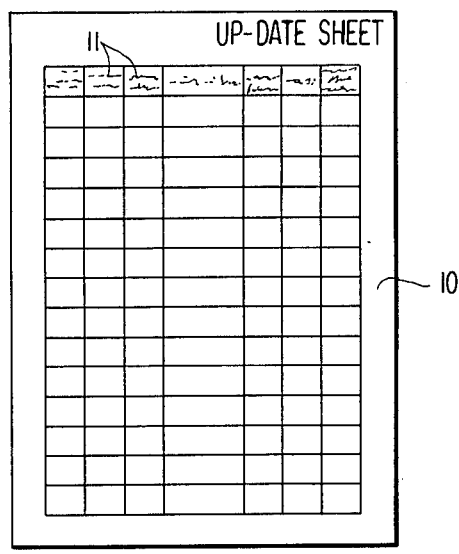
FIG. 1 is a plan view of a stored data update sheet employed in the invention.

Referring to the drawings in detail wherein like numerals designate like parts, the numeral 10 designates a preferably printed data update sheet which may be provided to users of the invention in tablet form with any convenient number of the sheets 10. Each sheet 10 is ruled to provide horizontal lines and vertical columns, as shown, and at the tops of the columns, as in the spaces 11, the indicia columns may be identified from left to right in FIG. 1 "System Report," "Fiche Date No.," "Frame Index No.," "Account No.," "Dollar Amount," "Reason for Change" and "Person." These designations or indicia on the update sheet 10 are examples only and any required designations may be employed. The sheet 10 is utilized for writing complete notations of microfiche update or deletion data for future reference by users of the system.

Figure 2:
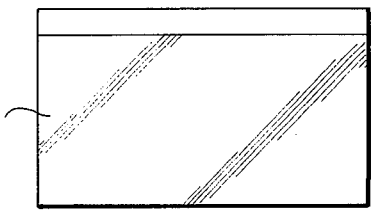
FIG. 2 is a similar view of a microfiche card or element.

In FIG. 2, a conventional translucent microfiche element 12 is shown prior to being ink marked in the procedure embodying the invention.

Figure 3:
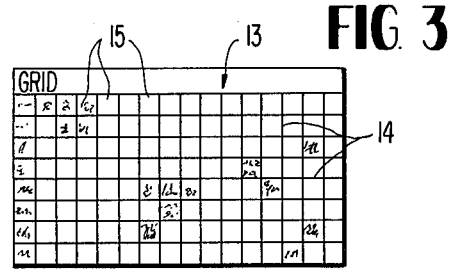
FIG. 3 is a similar view of a coacting microfiche encoded grid element.

FIG. 3 illustrates a transparent encoded grid card 13 of the same size as the microfiche 12 and having coordinates 14 defining rectangular spaces 15 within which are located opaque coded indicia or characters and numerals of a well known type indicative of stored information.

Figure 6:
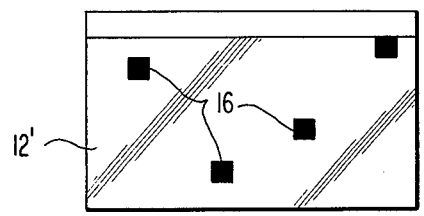
FIG. 6 is a further plan view of a microfiche card after marking with translucent and/or opaque ink in accordance with the invention.

FIG. 6 shows a microfiche element 12' after ink marking at 16 in accordance with the invention.

Figure 4:
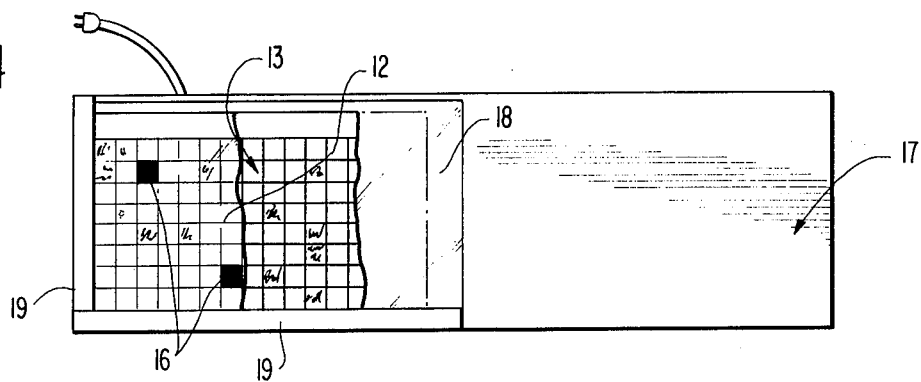
FIG. 4 is a plan view of an illuminated viewer.
Figure 5:
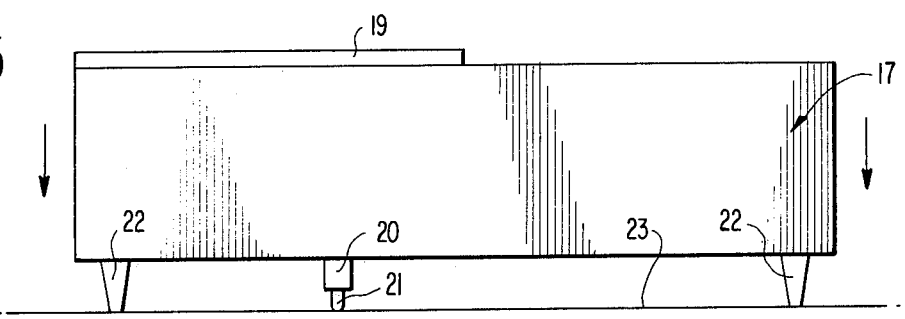
FIG. 5 is a side elevation thereof.

In FIGS. 4 and 5 of the drawings, there is indicated a simple illuminated viewer 17 having a preferably frosted rectangular illuminated viewing panel 18 on its upper side, one corner of which is bounded by a pair of right angular guide bars 19 which project somewhat above the top surface of the viewer. A momentary illuminating switch 20 for the viewer is provided on its bottom having an activating button or plunger 21, whereby slight downward pressure on the viewer 17 will illuminate the panel 18, and the release of such pressure will extinguish the illuminating light bulb beneath the panel 18, not shown. The viewer legs 22 are resiliently mounted or formed to allow the necessary depression of the unit relative to a table surface 23 as indicated by the arrows in FIG. 5.

In the use of the system embodying the invention, a person views a fiche 12 in any standard reader, not shown, and makes any desired notation on the available update sheet 10 to indicate updated or changed data, or deleted data, in the information storage system.

Following this, the person places the coordinate grid card 13 squarely in engagement with the guide bars 19, FIG. 4, and directly on the illuminated panel 18. The microfiche 12 to be changed or marked is placed on the grid element 13 directly and is also squarely engaged with elements 19 so that it will accurately register with the coordinate grid, whose coordinate indicia will be visible and viewable through the fiche when the panel 18 is illuminated. Thus, the frame (page) numbers on the grid are visible to the user through the fiche. Using special marker pens, not shown, any required rectangular areas of the fiche 12 are marked with either translucent or opaque ink as indicated at 16 in the drawings. Translucent ink in a distinquishing color, such as red, is employed for the marking 16 to indicate to a subsequent user or to alert such user to update data in these areas or frames so that detailed reference may be had to the update sheet 10 for clarification. If stored data in some areas or frames is totally deleted, preferably black opaque ink is employed for the marking or markings 16. Any number or arrangement of registering coordinate areas on the fiche can be thusly marked rapidly, neatly and in an efficient and accurate manner by using the provided marker pens.

When the marked fiche is subsequently placed in a standard reader, a person seeing a red or other colored light at the markings 16 formed by translucent ink will be alerted to the updated information. Light completely blocked by the black opaque ink markings will alert the subsequent user to data deletions.

While the invention is primarily useful in banks, savings and loan institutions, title companies and the like, it also finds utility in libraries, hospitals, schools and other institutions.

The entire system is economical, uncomplicated and serves a very useful purpose without the need for sophisticated equipment. The markings 16 may be applied in some cases with permanent ink and in other cases with washable ink as where only temporary data changes are to be indicated. The advantages of the invention should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

1. A microfiche marking system comprising in combination an illuminated viewer having a translucent viewing panel and a pair of right angular guide elements defining one corner of said panel, an encoded transparent coordinate grid element of rectangular shape for placement on said panel with a square corner thereof engaged with said guide elements, and a translucent microfiche element of rectangular form for placement directly on the grid element in registration therewith while a square corner of the microfiche element is engaged with the guide elements, whereby areas of the illuminated microfiche element may be accurately marked with translucent or opaque ink to indicate to a subsequent reader that certain stored data is updated, changed or deleted, the encoded indicia of the grid element being viewable through the translucent microfiche element while both elements are positioned in registration on said illuminated panel.

2. A microfiche marking system as defined by claim 1, and an associated stored data update sheet on which a user of the system may write complete notations of data update or deletion for ready reference by other persons.

3. A microfiche marking system as defined by claim 1, and said grid element carrying a substantially opaque coordinate grid defining multiple coded indicia areas, and opaque coded indicia in said areas of the coordinate grid.

4. A microfiche marking system as defined by claim 1, and said illuminated viewer having a box-like body, and a dependent momentary illuminating switch on the bottom thereof adapted for activation when the box-like body is depressed against a solid surface by a user of the viewer.

* * * * *